(12) United States Patent
Romagnoli

(10) Patent No.: US 7,021,469 B2
(45) Date of Patent: Apr. 4, 2006

(54) APPARATUS FOR FEEDING PARTICULATE PRODUCTS TO A USER MACHINE

(75) Inventor: Andrea Romagnoli, Castenaso (IT)

(73) Assignee: Tecnomeccanica S.r.l., Bologna (IT)

( * ) Notice: Subject to any disclaimer, the term of this patent is extended or adjusted under 35 U.S.C. 154(b) by 98 days.

(21) Appl. No.: 10/368,114

(22) Filed: Feb. 18, 2003

(65) Prior Publication Data

US 2003/0159975 A1   Aug. 28, 2003

(30) Foreign Application Priority Data

Feb. 28, 2002  (IT)  ............ BO2002A0100

(51) Int. Cl.
*B07B 13/04*  (2006.01)
(52) U.S. Cl. ............ 209/243; 209/244; 209/212; 209/213; 209/223.1; 209/910; 209/257; 209/260
(58) Field of Classification Search .......... None
See application file for complete search history.

(56) References Cited

U.S. PATENT DOCUMENTS

| | | | |
|---|---|---|---|
| 1,456,353 A | 5/1923 | Bare | |
| 3,709,327 A * | 1/1973 | Hite et al. | ............ 209/73 |
| 4,142,560 A | 3/1979 | Eisenberg | |
| 4,252,493 A | 2/1981 | Ilse | |
| 4,407,433 A | 10/1983 | Schroeder | |
| 5,490,546 A | 2/1996 | Lhoest | |
| 5,893,639 A * | 4/1999 | Tetoldini | ............ 366/18 |
| 6,571,736 B1 * | 6/2003 | Patterson et al. | ............ 119/230 |

FOREIGN PATENT DOCUMENTS

WO   WO 99/47423   9/1999

OTHER PUBLICATIONS

European Search Report pertaining to Application No. EP 03 42 5076.
Partial European Search Report corresponding to European Application No. EP 03 42 5076.

* cited by examiner

*Primary Examiner*—Donald P. Walsh
*Assistant Examiner*—Jonathan R Miller
(74) *Attorney, Agent, or Firm*—Fay, Sharpe, Fagan, Minnich & McKee, LLP

(57) ABSTRACT

An apparatus (1) for feeding a user machine (3) with particulate products, such as products for infusion like tea, chamomile and herbal teas in general, comprises a hopper (2) for dispensing the product and means (40; 7) for transferring the product from the hopper (2) to the user machine (3). The hopper (2) includes a feed body (4), with vertical walls (5), having an outlet opening (6) at its lower end. The transfer means (40) comprise a motor-driven, endless conveyor (7) facing the outlet opening (6). The apparatus also comprises adjustment means (50; 10, 11, 30) for adjusting the gap between the endless conveyor (7) and the outlet opening (6) according to the characteristics of the product feeding out the hopper (2).

21 Claims, 1 Drawing Sheet

APPARATUS FOR FEEDING PARTICULATE PRODUCTS TO A USER MACHINE

BACKGROUND OF THE INVENTION

The present invention relates to the automatic feeding of filling machines for dry flowables such as granular or shredded products for infusion, like tea, chamomile and herbal teas in general, and concerns in particular an apparatus that is used for feeding particulate products of this kind, especially for feeding a single machine with different products having different properties, even mixed together in variable blend ratios.

To feed filling machines with dry flowables of this type, prior art teaches the use of apparatus comprising: a loading hopper, wide at the top and narrower at the bottom; power-driven means for conveying the flowable product and associated with the outlet opening of the hopper; and mechanical agitators inside the hopper designed to prevent the product from clogging the outlet opening.

Besides the angle of the hopper walls, there are numerous factors influencing the flowability of different products. Some products flow less easily than others and, unless suitably agitated, tend to clog up the outlet opening of the hopper.

In the specific case of products for infusion, whose flowability may vary considerably, according to several factors such as, for example, the moisture content, the blend ratio of the different products, the mass/volume ratio of the products in the blend, the use of mechanical agitating means associated with the hoppers is essential to avoid the above mentioned problem.

The hopper agitators inside, and the agitator drive means outside, usually on the hopper cover, make the hopper difficult to access for cleaning purposes, with the result that cleaning is often incomplete and inadequate. Particularly in the case of products for infusion, this constitutes a serious drawback because the typical residual fragrance left by certain herbs after unsatisfactory cleaning may adversely affect the flavor of considerable quantities of product in subsequent batches, especially when there are frequent changes from one product to another, fed using the same apparatus.

On the other hand, it is also true that small-scale packagers of products for infusion, who use a single machine to fill different products, strongly feel the need for versatile feeding equipment which is capable of processing different products and which, at the same time, requires quick and simple procedures to change over from one product to another.

The main aim of the present invention is therefore to overcome the above mentioned drawbacks through an apparatus which is capable of processing many different products, even products mixed in any blend ratio, without the risk of clogging, and which is also easy to clean quickly and effectively before changing over to another product.

Another aim of the invention is to provide an apparatus that not only prevents contamination of the products subsequently processed but also prevents contamination of the surrounding environment by dust produced during processing which causes discomfort to personnel.

SUMMARY OF THE INVENTION

In accordance with the invention, the above aims are achieved by an apparatus for feeding particulate products to a user machine comprising: a product feed hopper; and means for transferring the product from the hopper to the user machine; wherein the hopper comprises a feed body with vertical walls having an outlet opening at its lower end and in that the transfer means include a motor-driven, endless conveyor facing the outlet opening; there being adjustment means for adjusting the gap between the endless conveyor and the outlet opening according to the characteristics of the product feeding out of the hopper.

BRIEF DESCRIPTION OF THE DRAWINGS

The technical characteristics of the invention, with reference to the above aims, are clearly described in the claims below and its advantages are apparent from the detailed description which follows, with reference to the accompanying drawings which illustrate a preferred embodiment of the invention provided merely by way of example without restricting the scope of the inventive concept, and in which:

DESCRIPTION OF THE PREFERRED EMBODIMENTS

Figure 1:
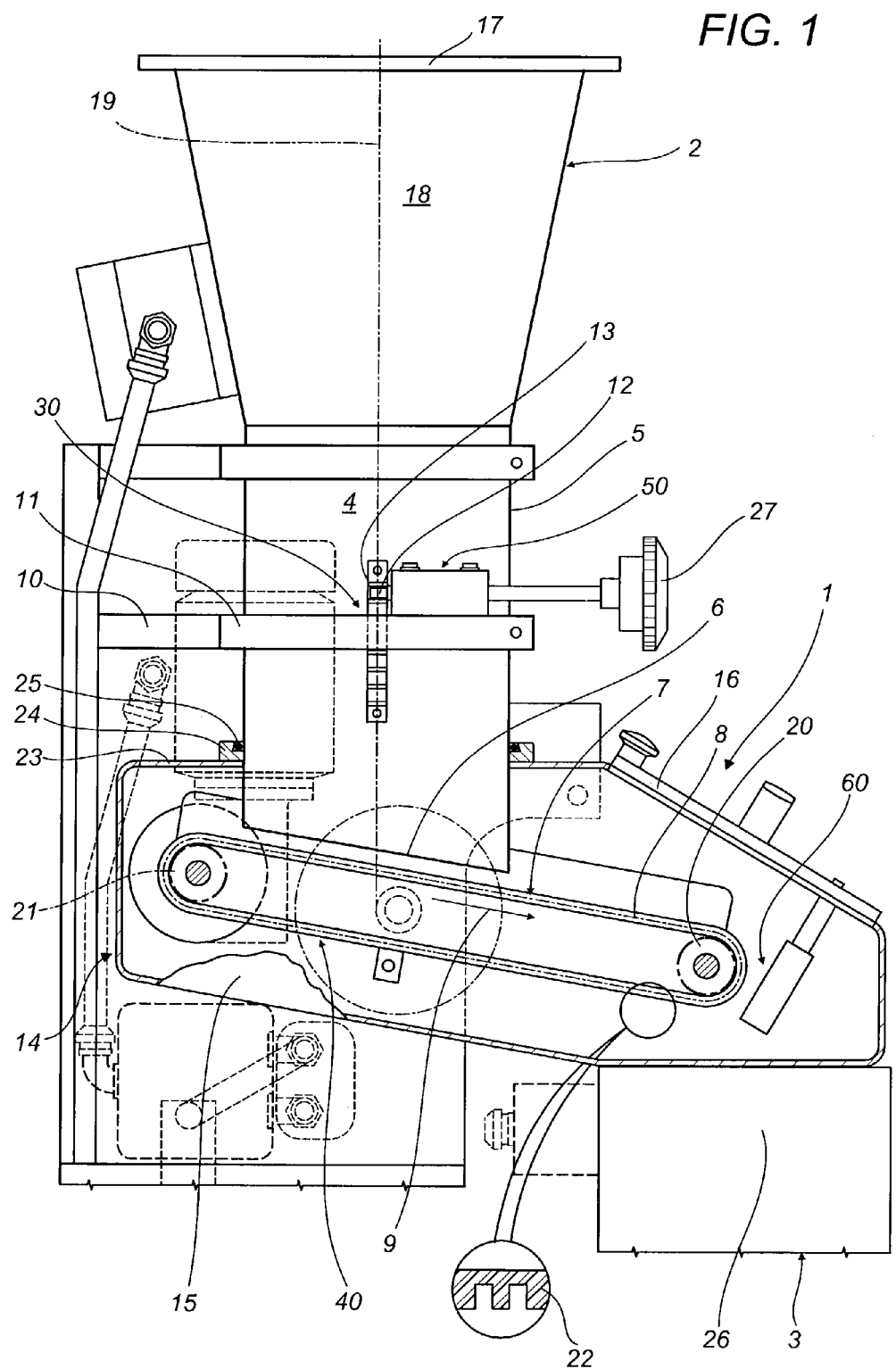
FIG. 1 is an assembly view, with some parts cut away in order to better illustrate others, of the apparatus according to the invention.

With reference to FIG. 1, the numeral 1 denotes in its entirety an apparatus used to feed particulate products—such as granular or shredded products for infusion, like tea, chamomile and herbal teas in general, whether single or mixed with each other—to a user machine 3, which is only partially illustrated.

The apparatus 1 essentially comprises a hopper, labeled 2 in its entirety, for feeding the product; and transfer means, labeled 40 in their entirety, located in a hermetically sealed, box-shaped housing 14.

The hopper 2 has a vertical axis 19, and consists of a cylindrical feed body 4, a truncated cone shaped body 18 integral with, and located above, the feed body 4, and a cover 17 that closes the top of the truncated cone shaped body 18.

The feed body 4 has vertical walls 5 and, at its lower end, an outlet opening 6 that is inclined at an angle to the horizontal and whose aperture for the passage of the products is as wide as the feed body 4 above it.

The transfer means 40—used to transfer the products from the hopper 2 to an infeed opening 26 of the machine 3—include an endless conveyor 7 facing the outlet opening 6 of the hopper 2 and inclined at the same angle as the outlet opening 6.

The conveyor 7, which has a corrugated face 8 facing the outlet opening 6 of the hopper 2, consists of a plurality of belts placed side by side and looped around a pair of parallel pulleys 20, 21—the pulley 21 being power-driven. The belts have parallel teeth 22 projecting towards the hopper 2 outlet opening 6 and extending transversely to the direction 9 in which the conveyor 7 runs.

Operating between the hopper 2 and the transfer means 40, the apparatus 1 includes adjustment means, labeled 50 in their entirety, used to adjust the gap between the endless conveyor 7 and the outlet opening 6 above it according to the characteristics of the product feeding out of the hopper 2.

More specifically, the adjustment means 50 include a fixed support 10, holding the hopper 2 in a guide 11, and a mechanism 30 comprising a pinion 12 engaging with a rack 13, mounted between the support 10 and the hopper 2.

The mechanism 30 can be operated using a handwheel 27 to lower or lift the hopper 2 relative to the conveyor 7 so as to move it towards or away from the outlet opening 6.

The box-shaped housing 14 which contains the transfer means 40 is hermetically sealed so that dust produced inside the housing 14 is not discharged into the surrounding environment.

A side wall 23 at the top of the housing 14, which has an opening 24 and a seal 25, connects the housing 14 to the feed body 4 at a level above the outlet opening 6 so that the latter is well inside the housing 14.

The housing 14 also has a first door 15, which is oriented vertically and through which the transfer means 40 can be removed en bloc by shifting them horizontally in a direction transversal to the walls 5 of the hopper 2 feed body 4. Thus, after finishing work with one product and before starting work with another product, the transfer means 40 can be removed so that they can be cleaned more thoroughly, quickly and easily from the outside while at the same time also making it easier to clean the interior of the housing 14.

The housing 14 also has a second door 16, which is also hermetically sealed and which mounts, on its inner surface inside the housing 14, magnetic separating means 60 designed to separate unwanted objects of ferromagnetic material from the product as it moves past them.

The magnetic separating means 60 are preferably mounted rigidly on the second door 16. Thus, when the second door 16 is closed, the magnetic separating means 60 extend inwards towards the conveyor 7.

The second door 16 can be lifted off the housing 14 together with the magnetic separating means 60 mounted on it: this facilitates cleaning of the door 16 and enables foreign material separated from the product to be removed quickly and easily.

The operation of the apparatus 1 can be briefly described with reference to FIG. 1. The product in the hopper 2 falls under its own weight into the cylindrical body 4, moving freely and without obstruction towards the outlet opening 6 and towards the conveyor 7 facing it. The simultaneous motion of the endless conveyor 7 draws the product out of the hopper 2 tangentially to the outlet opening 6 and carries it towards the infeed opening 26 of the user machine 3. The product traveling on the conveyor 7 goes through the magnetic field generated by the separating means 60 and then drops into the infeed opening 26.

The invention fully achieves the above mentioned aims and thanks, to its simple construction, is also reliable and economical to make.

It will be understood that the invention can be subject to modifications and variations without thereby departing from the scope of the inventive concept. Moreover, all the details of the invention may be substituted by technically equivalent elements.

The invention claimed is:

1. An apparatus for feeding particulate products to a user machine (3) comprising:
   a product feed hopper (2) comprising a feed body (4) with vertical walls (5) and an outlet opening (6) at its lower end;
   means (40; 7) for transferring the product from the hopper (2) to the user machine (3); the transfer means (40) including a motor-driven, endless conveyor (7) facing the outlet opening (6);
   adjustment means (50; 10, 11, 30) for adjusting a gap between the endless conveyor (7) and the outlet opening (6) according to the characteristics of the product feeding out of the hopper (2);
   wherein the adjustment means (50) include:
   a support (10) holding the hopper (2) in a guide (11);
   a mechanism (30) comprising a pinion (12) and a rack (13), the mechanism (30) being mounted between the support (10) and the hopper (2) to lift or lower the hopper (2) relative to the conveyor (7) to adjust the gap between the conveyor (7) and the outlet opening (6).

2. The apparatus according to claim 1, wherein the conveyor (7) has a corrugated face (8) facing the outlet opening (6) of the hopper (2).

3. The apparatus according to claim 2, wherein the corrugated face (8) has a plurality of parallel teeth (22) extending transversely to the direction (9) in which the conveyor (7) runs.

4. The apparatus according to claim 3, further comprising a hermetically sealed housing (14) containing the transfer means (40) and at least one outlet opening (6) of the hopper (2).

5. The apparatus according to claim 2, further comprising a hermetically sealed housing (14) containing the transfer means (40) and at least one outlet opening (6) of the hopper (2).

6. The apparatus according to claim 2, wherein the feed body (4) is cylindrical.

7. The apparatus according to claim 1, further comprising a hermetically sealed housing (14) containing the transfer means (40) and at least one outlet opening (6) of the hopper (2).

8. The apparatus according to claim 7, wherein the sealed housing (14) has a first door (15); the transfer means (40) being removable from the housing (14) through said first door (15).

9. The apparatus according to claim 8, wherein the first door (15) is oriented in such a way as to enable the transfer means (40) to be taken out of the housing (14) in a direction transverse to the walls (5) of the feed body (4) of the hopper (2).

10. The apparatus according to claim 9, wherein the first door (15) is vertical, so as to allow the transfer means (40) to be removed by moving them in a horizontal direction.

11. The apparatus according to claim 8, comprising magnetic means (60) for separating metallic objects from the particulate products, and further comprising a second hermetically sealed door (16) that can be opened to gain access to the magnetic separating means (60).

12. The apparatus according to claim 11, wherein the second door (16) can be removed from the housing (14), the magnetic separating means (60) being mounted on the second door (16) and removable together with it.

13. The apparatus according to claim 1, wherein the feed body (4) is cylindrical.

14. The apparatus according to claim 1, wherein the particulate products are products for infusion such as tea, chamomile and herbal teas in general, fed individually or in blends.

15. The apparatus according to claim 1, wherein the outlet opening (6) is inclined at an angle to the horizontal and the conveyor (7) is inclined at the same angle as the outlet opening (6).

16. The apparatus according to claim 15, wherein the conveyor (7) has a corrugated face (8) facing the outlet opening (6) of the hopper (2).

17. The apparatus according to claim 15, further comprising hermetically sealed housing (14) containing the transfer means (40) and at least one outlet opening (6) of the hopper (2).

18. The apparatus according to claim 15, wherein the feed body (4) is cylindrical.

19. The apparatus according to claim 1, further comprising a hermetically sealed housing (14) containing the transfer means (40) and at least one outlet opening (6) of the hopper (2).

20. An apparatus for feeding particulate products to a user machine (3), said apparatus comprising: a product feed hopper (2); and means (40; 7) for transferring the product from the hopper (2) to the user machine (3); wherein the hopper (2) comprises a feed body (4) with vertical walls (5) having an outlet opening (6) at its lower end; and wherein the transfer means (40) comprises a motor-driven, endless conveyor (7) facing the outlet opening (6); said apparatus further comprising:

adjustment means (50; 10, 11, 30) for adjusting the gap between the endless conveyor (7) and the outlet opening (6) according to the characteristics of the product feeding out of the hopper (2); and, a hermetically sealed housing (14) containing the transfer means (40) and at least one outlet opening (6) of the hopper (2).

21. An apparatus for feeding particulate products to a user machine (3), said apparatus comprising: a product feed hopper (2); and means (40; 7) for transferring the product from the hopper (2) to the user machine (3); wherein the hopper (2) comprises a feed body (4) with vertical walls (5) having an outlet opening (6) at its lower end; and wherein the transfer means (40) comprises a motor-driven, endless conveyor (7) facing the outlet opening (6); said apparatus further comprising adjustment means (50; 10, 11, 30) for adjusting the gap between the endless conveyor (7) and the outlet opening (6) according to the characteristics of the product feeding out of the hopper (2); wherein the adjustment means (50) include a support (10) holding the hopper (2) in a guide (11), and a mechanism (30) comprising a pinion (12) and a rack (13), the mechanism (30) being mounted between the support (10) and the hopper (2) in such a way as to lift or lower the hopper (2) relative to the conveyor (7).

* * * * *